(12) United States Patent
Erickson et al.

(10) Patent No.: US 11,981,084 B2
(45) Date of Patent: May 14, 2024

(54) LIFECYCLE CONDITION-BASED MANUFACTURING ALTERATION

(71) Applicant: Hewlett-Packard Development Company, L.P., Spring, TX (US)

(72) Inventors: Kristopher J. Erickson, Palo Alto, CA (US); Jarrid Wittkopf, Palo Alto, CA (US); Rafael Ballagas, Palo Alto, CA (US); David Wayne George, Palo Alto, CA (US); Lihua Zhao, Palo Alto, CA (US); William J. Allen, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 123 days.

(21) Appl. No.: 17/414,543

(22) PCT Filed: Jun. 18, 2019

(86) PCT No.: PCT/US2019/037706
§ 371 (c)(1),
(2) Date: Jun. 16, 2021

(87) PCT Pub. No.: WO2020/256702
PCT Pub. Date: Dec. 24, 2020

(65) Prior Publication Data
US 2022/0097306 A1    Mar. 31, 2022

(51) Int. Cl.
*B29C 64/393* (2017.01)
*B29C 64/379* (2017.01)
(Continued)

(52) U.S. Cl.
CPC ........ *B29C 64/386* (2017.08); *B29C 64/379* (2017.08); *G06Q 10/0635* (2013.01); *G06Q 10/0639* (2013.01); *G06Q 10/20* (2013.01); *G06Q 50/04* (2013.01); *B33Y 50/00* (2014.12); *B33Y 50/02* (2014.12); *B33Y 80/00* (2014.12); *Y02P 90/02* (2015.11); *Y02P 90/30* (2015.11)

(58) Field of Classification Search
CPC ..... B29C 64/386; B29C 64/379; B33Y 50/00; B33Y 50/02; B33Y 80/00; G06Q 10/0635; G06Q 10/0639; G06Q 10/20; G06Q 50/04; Y02P 90/02; Y02P 90/30
USPC ........................................................ 264/40.1
See application file for complete search history.

(56) References Cited

U.S. PATENT DOCUMENTS 7,931,197 B2   4/2011   Brandt et al.
8,025,227 B2   9/2011   Hall et al.
(Continued)

FOREIGN PATENT DOCUMENTS

DE    102018113709 A1   12/2018
WO    WO-2018140021 A1   8/2018
WO    WO-2019059761 A1   3/2019

*Primary Examiner* — Nahida Sultana
*Assistant Examiner* — Lawrence D. Hohenbrink, Jr.
(74) *Attorney, Agent, or Firm* — Shook, Hardy & Bacon L.L.P.

(57) ABSTRACT

In one example in accordance with the present disclosure, a system is described. The system includes a reader to read an identifier from a storage element associated with a part. An extractor of the system extracts, based on the identifier, lifecycle conditions specific to the part. A controller of the system alters manufacturing operations based on extracted lifecycle conditions for the part.

15 Claims, 4 Drawing Sheets

(51) Int. Cl.
*B29C 64/386* (2017.01)
*G06Q 10/0635* (2023.01)
*G06Q 10/0639* (2023.01)
*G06Q 10/20* (2023.01)
*G06Q 50/04* (2012.01)
*B33Y 50/00* (2015.01)
*B33Y 50/02* (2015.01)
*B33Y 80/00* (2015.01)

(56) References Cited

U.S. PATENT DOCUMENTS

| | | |
|---|---|---|
| 9,438,754 B2 | 9/2016 | Schoner et al. |
| 9,563,984 B2 | 2/2017 | Willis et al. |
| 11,079,748 B1 * | 8/2021 | Garvey ............ G05B 19/41885 |
| 2016/0067927 A1 * | 3/2016 | Voris .................... B29C 64/386 |
| | | 700/98 |
| 2016/0309877 A1 | 10/2016 | Papshev et al. |
| 2017/0311164 A1 | 10/2017 | Shin et al. |
| 2018/0136633 A1 * | 5/2018 | Small ................... G06Q 30/018 |
| 2019/0126556 A1 | 5/2019 | Levine et al. |
| 2019/0147585 A1 | 5/2019 | Hartman et al. |

* cited by examiner

LIFECYCLE CONDITION-BASED MANUFACTURING ALTERATION

BACKGROUND

Millions of products are formed every day. The development of a product for initial release, and the continued production of a product, includes several stages through which a product passes before it lands in the hands of a consumer. For example, a part is first designed and prototyped. When a part is ready to be produced it is manufactured, again in some cases via several independent manufacturing operations. The parts are then tested and passed through a quality assurance program before they are distributed to the public. The parts then pass through a distribution chain until they are ultimately delivered to a consumer of the product.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
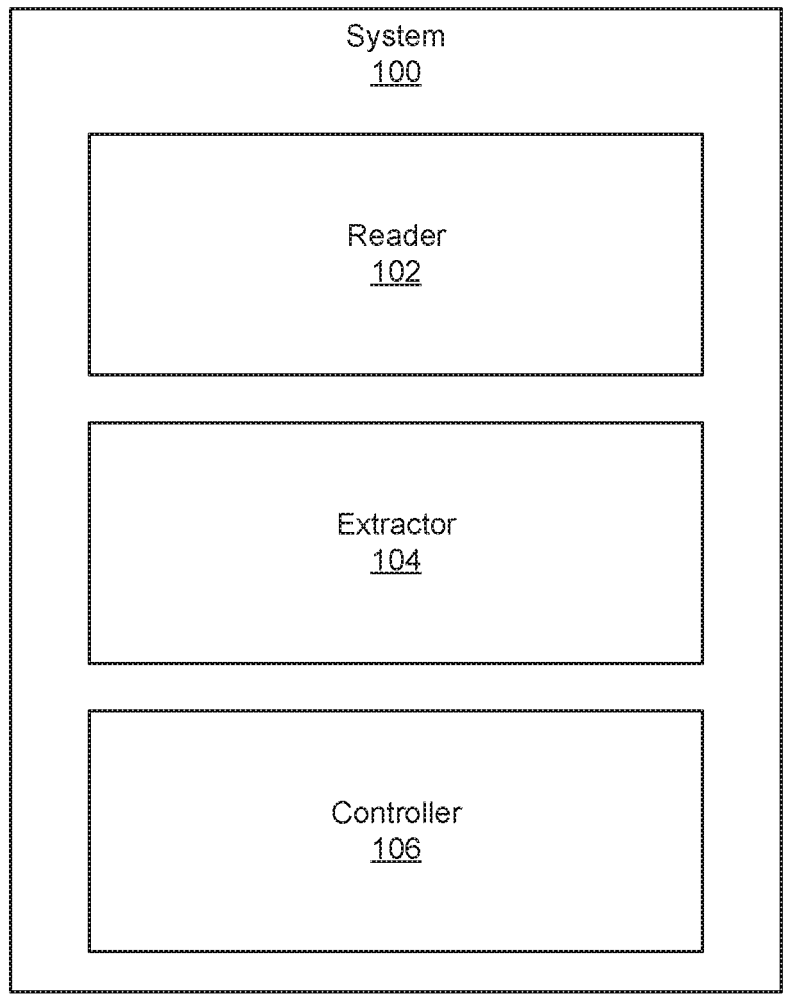
FIG. 1 is a block diagram of a system for altering manufacturing operations based on part-specific lifecycle conditions, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Around the world, millions of products are produced every day. Everything from household products to industrial machinery and everything in between. The manufacturing process for each of these products may include multiple stages such as design, formation, cleaning, post processing, testing, etc. The lifecycle of these products extends beyond manufacturing to include distribution and end use.

In general, product manufacturers are always cognizant of potential failure of their products. For example, if a vehicle is produced, but the components are manufactured in a way such that their quality is compromised, or that it varies enough such that the components do not mate with one another, the functionality and life of the vehicle is reduced and the customer reaction to the inoperability of the component may lead them to another manufacturer.

Accordingly, product failure and product defect play a role in consumer satisfaction.

Accordingly, the present specification describes a method and system for enhancing part failure and defect detection analysis. For example, some parts and assemblies perform better than expected. The present systems and methods, analyze these parts and it may be determined that cost enhancements are possible while still achieving desired levels of quality.

The present methods and systems enable better understanding of performance of parts and systems, and facilitate a better management of tradeoffs resulting in performance. For example, weak parts may be strengthened and overly robust parts may be altered. As yet another example, good practices from one manufacturing process may be promulgated to other parts.

Accordingly, the present specification describes a method and a system for mapping part failure to lifecycle conditions, and then adjusting the manufacturing operations so as to reduce the likelihood of such failures. That is, rather than previous open loop methods which rely on abstract and imprecise failure estimation, the present specification presents a closed loop solution that provides a mapping between failures and lifecycle conditions, thus readily and effectively identifying circumstances that led to the failure such that these circumstances may be addressed and remedied.

Specifically, the present system and method do this by monitoring the different lifecycle stages of the part and also performing part testing. From this information, correlations may be determined regarding lifecycle conditions and product testing. A positive correlation may indicate that a particular lifecycle condition led to a particular failure.

That is, there are numerous stages of a part lifecycle between part production and final object usage. That is to say, each product that is produced has its own unique life cycle through conception, design, manufacturing, distribution, and use. It may be desirable to provide information related to the lifecycle of a part with the part itself, such that specific characteristics of that part can be determined, tracked, and utilized. For example, the specific characteristics may be used to identify shortcomings in the manufacturing operation, such that the shortcomings may be addressed. The present specification provides such a mechanism.

Specifically, a system reads identifiers from RFID chips or other storage elements, associated with the parts. This identifier may have associated with it a large amount of information stored in a database. This information can include data relating to lifecycle conditions for the part. Data tied to this identifier may be read during different lifecycle stages and may be used to adjust future operations to result in a higher quality product.

That is, the present specification describes a system which reads an identifier from a part and receives lifecycle conditions for that part. The system then determines an enhancement to the manufacturing process based on the received information and triggers the enhancement. For example, the system may notify a designer to determine the enhancements.

In one example, the storage element, such as an RFID tag, may be used as a power source for other connected electronics (through a high-power interrogator) which may also be embedded in the part. Accordingly, additional attached powered sensor systems may be incorporated into the parts and be used for information gathering during the part lifecycle.

As will be described below, the storage element may be incorporated into the part at different times. For example, an automated component placement system installed on the additive manufacturing system may place the storage element during the manufacturing process itself (in-situ placed chip). In another example, the chip may be placed during, or after, the part has been post-processed.

While specific reference is made to RFID storage elements, other types of communication storage/transmission elements may also be used including, ultra-high frequency, and other, wireless communication devices and near field communication devices, among others.

Specifically, the present specification describes a system. The system includes a reader to read an identifier from a storage element associated with a part. An extractor of the system extracts, based on the identifier, lifecycle conditions specific to the part and a controller of the system alters manufacturing operations based on extracted lifecycle conditions for the part.

The present specification also describes a method. According to the method, an identifier is read from a storage element associated with a part. Lifecycle conditions specific to the formation of the part are extracted based on the identifier and part testing is performed on the part following formation. The manufacturing operations are altered based on extracted lifecycle conditions for the part and an output of the part testing.

In another example, a system includes a reader to read an identifier from a storage element embedded within a three-dimensional (3D) printed part and an extractor to extract, based on the identifier, lifecycle conditions specific to the 3D printed part from a database. In this example, the lifecycle conditions are mapped to the identifier in the database. A controller of the system alters print operations based on extracted lifecycle conditions for the 3D printed part. The system also includes a testing device to perform part testing on the 3D printed part based on the extracted lifecycle conditions for the 3D printed part.

Accordingly, by attaching a storage element, such as a radio-frequency identification (RFID) chip, to a part, each part can obtain a unique identity. This identity may be used throughout the lifecycle of the part, allowing for tracking of information for that part and alteration of the manufacturing operations that make that part and others based on actual data rather than estimations as to causes of operational defects and/or failures.

In some examples, this information may be stored at a remote database. However, in some examples, by utilizing an electronic tag, such as an RFID chip, some of that information can be stored on the part itself. With an electronic protocol like RFID, the part may be read by an appropriate reader at any time by the manufacturer, intermediary, or final user.

The information gained at each stage within the part lifecycle can be useful for optimizing the part manufacturing. Useful information about creation of the final product in its final destination can be added to the database throughout the parts lifecycle. This can include the print conditions utilized, the post-processing operations employed, part testing information, conditions during shipping and storage, and more. Additional information can also be collected during a quality assurance stage when a part is determined to be acceptable or not. Additional information can even be determined once the part is in the hands of the final user. Such collected information may be correlated to the information about how the part was made. If sensors like an embedded strain gauge are also incorporated into the part, richer information about the part status can be obtained, providing better correlation between actual final part performance/use to intended performance/use.

All this information can then be utilized for optimizing the manufacturing process of parts. For example, if it is found that a particular 3D printed part with a certain geometry at a particular place in the print bed always fails to have the right dimensions, as identified from a 3D scan of the part, that particular print situation can be addressed and corrected for example by changing the location of parts with that geometry within the print bed. Without such a system, if multiple parts are printed over the course of a week and a defect is eventually found on just one of those parts, reconfiguring the print conditions to eliminate that one defect is largely impossible. However, using the current systems and methods, the position and time of printing can be determined, and future prints can address the individual condition which caused the defect.

As another example, it may be found that particular print conditions lead to parts which cannot be joined together. Without the described approach, there would simply be a particular percentage of parts which fail to be able to be joined, with the failures being endemic and not being tied to combinations of parts that have particular print conditions. Accordingly, with enough data about part failures which are tied to lifecycle conditions, better design rules can be developed about part design, distribution within printer beds, corrections for atmospheric conditions, etc.

Additional information can be obtained as the part is used by the final consumer. For example, a part may include active sensors (i.e., strain gauge, moisture sensor, etc.). Information from these sensors can be correlated to how often a part is used and when it may become discarded. This information may then be used to redesign the manufacturing process for the part. Even without embedded sensors, parts can be tracked during usage and failures of parts can be inferred by for example, changes in usage, travel to a disposal facility, and general conditions in the area (temperature, humidity, etc.). These conditions may be inferred as possible stimuli for the part failure, again leading to more intelligent redesign of a part.

Such systems and methods 1) facilitate correlation between part failure and part lifecycle conditions; 2) facilitate closed loop manufacturing optimization, and 3) facilitate product design by evaluating performance of multiple components at a time. However, it is contemplated that the devices disclosed herein may address other matters and deficiencies in a number of technical areas.

As used in the present specification and in the appended claims, the term "lifecycle condition(s)" refers to those conditions experienced at any stage along a part lifecycle. That is, a part may pass through various stages including formation, post processing, distribution, and end use. In each of these stages the part is subject to various conditions which may affect its functionality.

Turning now to the figures, FIG. 1 is a block diagram of a system (100) for altering manufacturing operations based on part-specific lifecycle conditions, according to an example of the principles described herein. As described above, without such a system (100) altering manufacturing operations may include manual, blind evaluation of potential sources of a manufacturing defect or failure. However, the present system (100) provides directed feedback used for alteration of manufacturing operations based on real lifecycle conditions observed during formation of the parts.

The system (100) includes a reader (102) to read an identifier from a storage element associated with a part. That is, each part may be associated with a storage element, the storage element may include various pieces of information including a unique identifier for the part.

The storage element may be of a variety of types. For example, in some cases, the part is a 3D printed part. In this example, the identifier may be embedded in the 3D printed part. In this example, an additive manufacturing system forms the 3D printed part. This may be done in a number of ways. In one example, to form the 3D printed part, a build material, which may be powder, is deposited on a bed. A fusing agent is then dispensed onto portions of the layer of build material that are to be fused to form a layer of the 3D printed part. The system that carries out this type of additive manufacturing may be referred to as a powder and fusing agent-based system. In this example, deposition of layers of build material may be paused such that a storage element such as an RFID tag or other electronic tag can be placed in a body of the 3D printed part. Printing is resumed, thereby embedding the storage element in the body of the 3D printed part. Again, while specific reference is made to RFID storage elements, other types of communication storage/transmission elements may also be used including UHF and other wireless communication and near field communication.

Another way of 3D printing selectively applies binding agent to build material which glues particles of the build material together. In this example, a "green" part is prepared by selectively applying binding agent to powdered build material. The green part is then removed from the printer and loaded into a sintering furnace. Sintering with gradually increasing temperature and using appropriate ambient pressure burns out the binding agent while simultaneously sintering particles with binder disposed thereon.

In yet another example, a laser, or other power source is selectively aimed at a powder build material, or a layer of a powder build material, to form a slice of a 3D printed part. Such a process may be referred to as selective laser sintering. In yet another example, the additive manufacturing process may use selective laser melting where portions of the powder material, which may be metallic, are selectively melted together to form a slice of a 3D printed part. In yet another example, the additive manufacturing process may involve using a light source to cure a liquid resin into a hard substance. Such an operation may be referred to as stereolithography.

In any of these examples, 3D printing may be paused to place an electronic storage element in the 3D printed part. In other examples, the storage element may be simply attached to a surface of a part, for example via an adhesive. In yet another example, the storage element may be printed on a surface of the part. While specific reference is made to many ways to attach a storage element to a part, any number of methods may be used so long as an identifier is written onto and readable from a part.

The reader (102) may be of a variety of types and may be selected based on the storage element. For example, the storage element may be a radio-frequency identification (RFID) tag. In this example, the reader (102) may be an RFID reader. In this example, the RFID tag receives electromagnetic energy from the RFID reader (102) antenna. Then, using its own internal battery or energy harvested from the reader (102), the tag sends radio waves back to the reader (102). The reader (102) picks up the RFID tag radio waves and decodes them into an identifier. Using an RFID tag and an RFID reader (102) may be beneficial in that it can operate without line-of-sight communication. That is, as described above, in some examples, the storage element is embedded into build material, i.e., the 3D printed part. In this example, the information stored on the RFID chip can be read by a reader (102) through the body of the 3D printed part.

While particular reference is made to a particular reader (102) such as one to read an RFID tag, a variety of types of readers (102) may be implemented that rely on different communication protocol. For example, the reader (102) may be a wireless scanner such as a UHF scanner and a near-field communication scanner.

As used in the present specification and in the appended claims, the term, "reader" refers to various hardware components, which may include a processor and memory. The processor may include the hardware architecture to retrieve executable code from the memory and execute the executable code. As specific examples, the reader as described herein may include computer readable storage medium, computer readable storage medium and a processor, an application specific integrated circuit (ASIC), a semiconductor-based microprocessor, a central processing unit (CPU), and a field-programmable gate array (FPGA), and/or other hardware device.

The memory may include a computer-readable storage medium, which computer-readable storage medium may contain, or store computer usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the reader (102), cause the reader (102) to implement at least the functionality of reading an identifier from a storage element associated with a part.

The system (100) also includes an extractor (104) to extract lifecycle conditions specific to the part. That is, as described above, a part may experience various conditions during its lifecycle, and the extractor (104) collects those unique lifecycle conditions. These unique lifecycle conditions may provide valuable insight when viewed alongside detected manufacturing defects, test failures, or use failures. In the case of a 3D printed part, the lifecycle conditions may include print conditions for the 3D printed part.

The lifecycle conditions that are extracted are numerous. Some of the lifecycle conditions may be measured during the manufacturing process. For example, one particular stage of development of a part is the formation stage where a part is formed. In some examples, the conditions of the formation stage may be measured. Examples include a part pose within a build volume. As used in the present specification the pose of a part includes its location and orientation within the build volume. Other examples include part temperature, manufacturing duration, part yield, and environmental conditions. Similarly, conditions exist in other lifecycle stages such as a post processing stage and quality control stage, among others. Similarly, the extractor (FIG. 1, 104) may extract condition information from each of these stages.

In some examples, components other than a storage element are disposed in or on a part. For example, a sensor may be embedded in a 3D printed part. In this example, the sensor measures a lifecycle condition. The sensor may be of a variety of types. For example, the sensor may be a temperature sensor to monitor a temperature of the part as it is being formed. The sensor may be a moisture sensor to monitor a humidity of the part as it is being formed. Other examples of sensors that may be placed into the build material include a strain gauge, a stress gauge, and a displacement sensor. In this example, the extractor (104) extracts information from the other sensor disposed on the part and the controller (106) alters the manufacturing operations further based on conditions measured by the sensor. While specific reference is made to the sensors collecting information during a formation stage, these same sensors may collect information during other stages, which information may similarly be used by the controller (106) in determining alterations to the manufacturing operations.

Other lifecycle conditions may be based on preconfigured information. For example, in the formation stage, examples of preconfigured information include build material information, agent material information, and manufacturing device type. In some examples, formation conditions may include everything in the provenance of the files and materials used such as a version of the computer-application drafting (CAD) application used. While specific reference is made to formation stage conditions, the other stages of the lifecycle of a part may also include preconfigured information used to alter manufacturing operations. For example, a sandblaster in a post processing stage may indicate a material used for sandblasting as well as an intensity of the sand blasting. In yet another example, a tensile tester in a part testing stage may indicate the forces that the part was exposed to during testing.

While specific reference is made to a few specific lifecycle conditions that are extracted, other lifecycle conditions may also be extracted or otherwise determined and eventually mapped to manufacturing operation deficiencies. That is, each of the above-mentioned conditions, and others, may play a part in the operation of a particular part and as such may be a mode of failure for a part. For example, if a part is too hot during manufacturing, this may affect the material properties of the part such that it fails earlier than if the part were manufactured at a cooler temperature.

Figure 2:
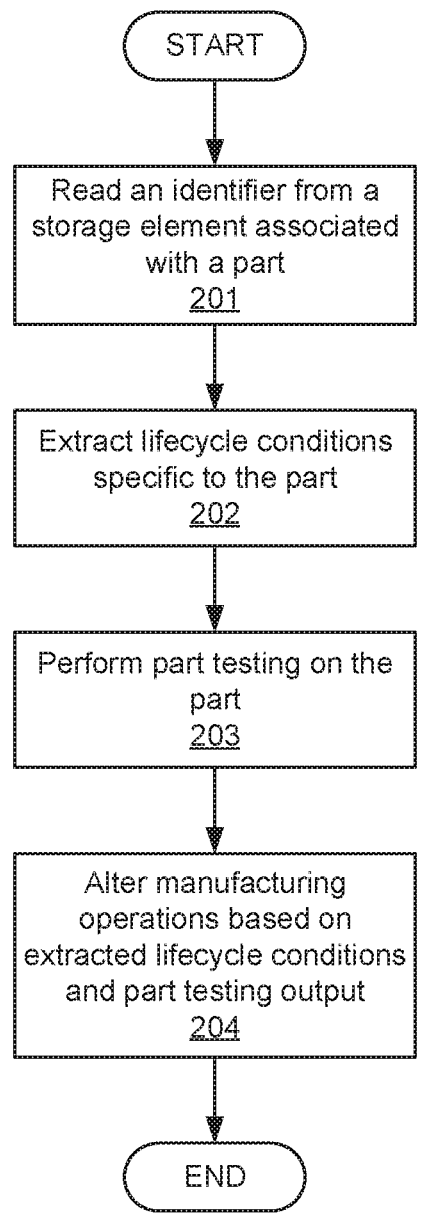
FIG. 2 is a flow chart of a method for altering manufacturing operations based on part-specific lifecycle conditions, according to an example of the principles described herein.

In other words, during the lifecycle of the part and specifically during the manufacturing process itself, there is information that can be tied to specific parts using an associated identifier (from the RFID tag or other storage element) and a database. This information may include manufacturing conditions (powder build material used, agents used, environmental temperatures, manufacturing duration time, object position in the bed, etc.), information about the state of the powder used (% recycled, oxidation level if sensor available), printer ID, batch number, machine type, printer owner, printer temperature, and room humidity and other lifecycle conditions. In one specific example, the information may include information generated based on sensor measurements. For example, the additive manufacturing device may simulate a condition based on an output of a sensor. Such information may be included in the manufacturing conditions. As a specific example, the additive manufacturing device may simulate a temperature experienced by a 3D printed object (FIG. 2, 218) during the print cycle based on an infrared image in the additive manufacturing device (FIG. 2, 218). Additionally, if an RFID chip with an antenna is printed and sensors are also placed in the bed during the additive manufacturing operation and become embedded within the print bed, useful data about the internal print bed temperature could be gathered and read through the powder bed.

In one particular example, the lifecycle conditions represent an intentional variation from default lifecycle conditions. For example, an operator may intentionally introduce variations into a design, and track them and their performance through testing and in the field with the system (100). The returned data could be used to 1) determine suitability of the new design and/or 2) enhance future designs and/or builds.

The manufacturing conditions may be extracted from any number of sources. As will be described below, the information may be onboard the storage element and may include the part number and other information. In some examples, the storage element may include just a unique identification of the part. However, if a tag with more storage space is used, additional information could possibly be on-boarded onto the chip itself or a connected memory module.

As a first example, the lifecycle conditions may be extracted from the storage element on, or embedded in, the manufactured part. That is, while reference was made to an RFID tag being the storage element, other and larger storage elements may be embedded or disposed on the part, which large storage elements may include additional space on which lifecycle conditions were written. In this example, the part itself may include sensors that measure certain lifecycle conditions. The output of the sensors in whatever location they may be, may be written to the storage element for later extraction by the extractor (104).

In another example, the extractor (FIG. 1, 104) extracts information from a device by which the part passes along its lifecycle. That is, as described above the specific devices that act upon the part may include sensors to measure certain lifecycle conditions or may include preconfigured lifecycle conditions such as device parameters. These outputs (i.e., from a device sensor and/or preconfigured information), may be written to the storage element for later extraction by the extractor (104).

In another example, the manufacturing conditions may be extracted from a database. That is, the sensors and/or devices described above may, instead of writing the information to a storage element on or in the part, may transmit the information to a database. This data in the database is mapped to the identifier. Accordingly, the reader (102) upon reading the identifier provides a location from which the extractor (104) can collect the lifecycle conditions. Associating this information with an identifier on the part enhances the manufacturing operation. That is, as described above, previously an operator would have to manually determine the lifecycle conditions and/or the alterations to make to the manufacturing operations. However, using the current system (100) such data extraction is automated.

As used in the present specification and in the appended claims, the term, "extractor" refers to various hardware components, which may include a processor and memory. The processor may include the hardware architecture to retrieve executable code from the memory and execute the executable code. As specific examples, the reader as described herein may include computer readable storage medium, computer readable storage medium and a processor, an application specific integrated circuit (ASIC), a semiconductor-based microprocessor, a central processing unit (CPU), and a field-programmable gate array (FPGA), and/or other hardware device.

The memory may include a computer-readable storage medium, which computer-readable storage medium may contain, or store computer usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the extractor (104), cause the extractor (104) to implement at least the functionality of extracting manufacturing conditions specific to a formation of the part.

Moreover, as used in the present specification and in the appended claims the term "extract" refers to an operation wherein information/data is pulled from the 3D printed object (FIG. 2, 218) or the database. That is, as mentioned above, data may be stored on a storage element on the 3D printed object or at a remote location identified by the storage element. Data that is extracted from either location is information that is read from those locations. For example, a database may include information, and the extractor (1334), may upon receiving an indication of the identifier, read the information from the database. That is, the identifier may point to an address in the database where the information about post processing is held, and the extractor may receive that address, locate the address on the database, and read, or extract, the contents found at that location.

Based on the extracted lifecycle conditions for the part, a controller (106) alters the manufacturing operations. Specifically, the lifecycle conditions that are experienced may be extracted and from this information it may be determined that some portion of the manufacturing process is defective in that it results in an undesirable lifecycle condition. For example, it may be determined that part temperatures are too high, which may indicate that the parts are too close in a build area, or that the parts are not properly cooled. Accordingly, in this example, the controller (106) may alter the cooling mechanism of the manufacturing process.

In another example, the alterations to be made rely on part testing. For example, following manufacture, many parts are subject to testing to determine their compliance with certain metrics. During such testing it may be determined that a part does not comply with the metric. The controller (106) may then consider a part history for this part. That is, the controller (106) may identify a lifecycle condition that may map to a cause of the non-compliance. The controller (106) then alters a manufacturing operation that led to the non-compliant state. That is, if failures occur for an RFID-tagged parts, the failure can be tied to the exact part (with its associated manufacturing parameters) as opposed to a generic part of that type (which may have actually been acceptable under different manufacturing conditions).

In some examples, the controller (106) determines a combination of manufacturing operations that result in a best performing part. For example, multiple elements for a part may be varied. As a specific example a part may include two particularly relevant dimensions, a moving hinge, and a flexible portion. During manufacturing, various manufacturing conditions and part sizes for these features may be formed (i.e., slightly different geometries, different bed positions, different print temperatures) and testing may be performed to determine which partial parts were satisfactory as indicated by test results. The controller (106) then determines the best possible way to combine these variations to 1) ensure each relevant feature is satisfactory and that interoperate with each other to result in a best performing part. This approach would allow for quicker iteration on each of the relevant design features compared to if all relevant design features were designed initially, and then re-designed based on further alterations to a subsequent relevant feature. In some examples, the controller (106) may use regression or machine-learning to determine a cause of failure and/or to predict operations that will produce a best performing part.

As yet another example, the system (100) may track performance of the part in the field and collect similar information as to which variations, or combinations thereof, resulted in satisfactory performance.

As used in the present specification and in the appended claims, the term, "controller" refers to various hardware components, which may include a processor and memory. The processor may include the hardware architecture to retrieve executable code from the memory and execute the executable code. As specific examples, the reader as described herein may include computer readable storage medium, computer readable storage medium and a processor, an application specific integrated circuit (ASIC), a semiconductor-based microprocessor, a central processing unit (CPU), and a field-programmable gate array (FPGA), and/or other hardware device.

The memory may include a computer-readable storage medium, which computer-readable storage medium may contain, or store computer usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the controller (106), cause the controller (106) to implement at least the functionality of altering a manufacturing operation based on extracted manufacturing conditions for a part.

Accordingly, the system (100) as described herein provides a way to not only identify part failures and part defects, but to map those part failures and defects to particular lifecycle conditions and to alter the manufacturing operations that led to the lifecycle conditions which resulted in the failure or defect. That is, since the identity of the part may contain information about how the part was printed (printer location, printer type, environmental conditions, powder aging, etc.), outcomes during part testing can be correlated to the lifecycle conditions, with design revisions being implemented based upon this feedback.

FIG. 2 is a flow chart of a method (200) for altering manufacturing operations based on part-specific lifecycle conditions, according to an example of the principles described herein. According to the method (200) an identifier is read (block 201) from a storage element associated with a part. As described above, the identifier may be disposed on, or in the part or in some cases in a build area adjacent the part. Also as described above this may be done in any number of ways including using an RFID scanner to interrogate an RFID storage element in a 3D printed part.

An extractor (FIG. 1, 104) then extracts (block 202), based on the identifier, lifecycle conditions specific to the part. The lifecycle conditions may be extracted (block 202) from the storage element itself or from a database associated with the part. In some examples, the extracted information may be encrypted to protect against unwanted access and/or manipulation. Such an encryption could be used to verify the accuracy and integrity of returned data to ensure it has not been altered or tampered with.

Part testing may then be performed (block 203) on the part following manufacturing. That is, after a part is manufactured it may be subject to testing to ensure its robustness and quality. A variety of tests may be performed including 3D-scanning of parts and correlations back to intended geometry, surface roughness of parts, non-destructive mechanical testing of parts (ultra-sound or other), CT scanning of parts for internal pore structure determination and local density determination, destructive testing of test features built within a part, and part color information. A failure of any one of these tests may indicate an insufficiency of a part for distribution.

In some examples, the part testing may be performed (block 203) in use by an end consumer. That is, a part may include embedded sensors to detect the presence of certain stress and/or strains on the part. Accordingly, these sensors may collect information as they are being used by a consumer, which information may be predictive of failure. In either case, the testing information may be used to detect product defects and predict/indicate product failure.

That is, as used in the present specification and in the appended claims, product testing refers to facility-based testing such as diagnostic and quality assurance testing as well as collecting data while the part is in an actual use environment.

Based on the extracted lifecycle conditions for the part and an output of the part testing, the controller (FIG. 1, 106) may alter (block 204) manufacturing operations accordingly. That is, the controller (FIG. 1, 106) may map detected defects and/or predicted failures to particular lifecycle conditions and may alter the manufacturing operations accordingly. As a specific example, either during testing or during use, product testing may indicate that an unexpected, and potentially destructive, amount of strain is induced in a particular part. Based on this information, the controller (FIG. 1, 106) may analyze the lifecycle conditions and determine that this particular part was also subject to abnormally high environmental humidity during formation. Accordingly, the controller (FIG. 1, 106) may adjust the humidity within the manufacturing environment to prevent future high strain values in future manufactured parts.

The alterations made to the manufacturing operations are wide ranging. For example, manufacturing parameters and operating characteristics of the manufacturing devices may be altered. That is, the temperature, humidity, part pose within the bed during printing, and time of different manufacturing stages may be adjusted as to prevent certain conditions that precede a particular defect.

In another example, a part design file may be altered. For example, a diameter of a portion of a part where failure was either expected or experienced may be increased. As another example, a design file could be altered by stiffening a zone of a part that fails in the field based on real world application testing.

As yet another example, a location of manufacturing devices may be altered. For example, having a large number of tagged parts within a factory floor allows for mappings of part flows to be done, allowing for efficiency efforts to be more easily managed from these realistic maps, as opposed to a more theoretical framework which would be used in the absence of such an approach. That is, the factory floor itself may be altered to ensure efficiency and that proper part properties result. As a specific example, it may be determined via sensors at different stages of the manufacturing chain that parts are bottlenecking at a sandblasting stage. Accordingly, additional sandblasting devices or a different layout may facilitate the reduction in this bottleneck. In some examples, such a change in the process may create a change in the most efficient layout or number of devices. For example, the sandblasting bottleneck may be predicted based on a decision to increase the amount of sandblasting, which may have resulted from a failure due to a lack of sandblasting (e.g., a surface was too rough).

As yet another example part orientation along a manufacturing chain may be altered. While specific reference is made to a few particular alterations, any number of alterations may be made to any number of manufacturing operation stages or stations.

In some examples, the manufacturing operations are altered based on output of product testing on parts having similar characteristics. As used in the present specification and in the appended claims, the term characteristics refers to similar manufacturing conditions and/or similar features. That is, information can be combined from multiple parts of the same or similar designs. Doing so allows for determination of how an ensemble of manufacturing conditions affects parts that are produced. Basing alterations on multiple data points ensures that more accurate corrections/alterations are made to the manufacturing operations.

As a specific example, it might be found that a particular hinge design is needing to be redesigned, and this hinge is used in a number of different parts. In this way, a library of commonly used design structures can be made available to users with these structures being updated and optimized from information about different parts that use these structures.

Figure 3:
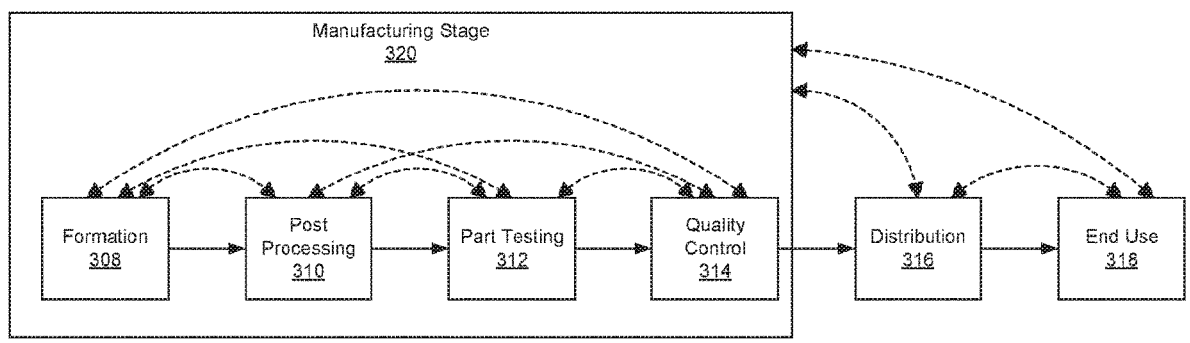
FIG. 3 is a diagram of altering manufacturing operations based on part-specific lifecycle conditions, according to an example of the principles described herein.

FIG. 3 is a diagram of altering manufacturing operations based on part-specific lifecycle conditions, according to an example of the principles described herein. As described above, throughout its life, a part passes through multiple stages, some of these stages are manufacturing-related, others are distribution-related, and others are use-related. For example, a part may first pass through a formation stage (308) where it is formed. For example, in the case of a 3D printed part, a fusing agent-based system, a binding agent-based system, a selective laser sintering system, and a selective laser melting system among others may be used to form the 3D printed part. For other types of parts different devices are used in this formation stage (308).

Following formation, the part passes through a post processing stage (310) where post processing operations are executed. Such post processing operations include cleaning, finishing, dying or otherwise coloring, etc. In one particular example, a particular post processing operation includes unpacking a 3D printed part from the surrounding build material.

During a part testing stage (312), the part is subject to any number of operations to determine a parts suitability for release to the public. Examples of tests include 3D-scanning of parts, surface roughness tests, non-destructive mechanical testing, CT scanning of parts, and destructive testing of parts. The output of this stage may indicate whether or not the part meets part performance metrics.

In a quality control stage (314) other criteria may be used to determine whether or not the part is to be released. In one specific example, the part may be analyzed to determine whether its aesthetic value coincides with certain aesthetic criteria. While particular reference is made to particular operations within each stage, different operations may be performed in each of the mentioned stages. The formation stage (308), post processing stage (310), part testing stage (312), and quality control stage (314) may be referred to as the manufacturing stage (320) with manufacturing operations referring to the activities and actions executed at each of these stages. These manufacturing operations may be adjusted based on collected feedback from any of the other stages. Moreover, the conditions measured during any of these manufacturing stages may be referred to as manufacturing conditions.

Once manufactured, the part is passed along a distribution stage (316) which may include shipping and storage. For example, a part may leave a manufacturing facility and be transported via truck to an intermediary facility where it is held for further distribution. As with the manufacturing stages the distribution stage (316) also has various operations including transit time, storage time, storage temperature. The conditions during shipping and storage may include stresses/strains induced on the part.

Finally, once made and distributed, the part enters an end use stage (318) which refers to the stage where it is used by a consumer. As with the other stages, during this stage, there are a number of conditions seen by the part. Examples include a temperature of the part during use and strains/stresses on the part during use among others.

While specific reference is made to particular stages that a part passes through throughout its lifecycle, other or additional stages may also be a part of the product lifecycle. Moreover, other stages may not be as linear. For example, some manufacturing operations may be performed, then assemblies/parts/unfinished goods are shipped, then more manufacturing operations performed, then more shipment. As an example, an electric razor may be produced, but without trim. It may be then sent to a regional distribution center where different sub-sets of the product are processed one way and another sub-set is processed another way. Such manufacturing logistics, while efficient, can be very complex, thus highlighting the efficacy of the present system (FIG. 1, 100). That is, the present system (FIG. 1, 100) allows not only simple serial number tracking, but facilitates attaching a history to each part such that a complex supply chain can manage parts and delivery and assembly parameters.

Returning to FIG. 3, information collected during any one of these stages may be used to adjust operations in other stages. That is, conditions detected along the lifecycle, e.g., in any one of the formation, post processing, part testing, quality control, distribution, end use stages, or any other stage, may be used to adjust manufacturing operations. Accordingly, the extractor (FIG. 1, 104) may extract information related to any stage. As will be described below, the information may be extracted from a sensor disposed in the part, a sensor disposed in a device used during the stages, or may be preconfigured information at the stage.

For example, as described above, in some examples the extractor (FIG. 1, 104) extracts information from a sensor during a formation stage (308). Such a sensor may be one disposed on the part itself or one that is disposed in the manufacturing device that formed the part. Similarly, the extractor (FIG. 1, 104) extracts information from the sensor, or another sensor during other lifecycle stages. The additional information that is extracted may be a manufacturing condition, or a non-manufacturing condition. That is, the extractor (FIG. 1, 104) may extract conditions experienced in at least one stage through which the part passes along its lifecycle.

In some examples, the information collected during these other stages may be collected from a sensor embedded in the part. For example, a strain gauge may be disposed in a part and may be used to measure part strain during any one of the lifecycle stages. In some examples, the additional sensor may be activated by the storage element. For example, the storage element may be an RFID tag that upon receiving a voltage activates the sensor to measure a characteristic and to pass that characteristic either to a storage element or to update an entry in a database.

In another example, the information collected during these other stages is collected from a sensor in devices used during the particular stage. For example, during a part testing stage, it may be determined at what stress a particular tested part fails. As with the previous example, this information may be passed either to a storage element or to a database.

In yet another example, the information collected during these other stages is preconfigured information. That is, each post processing stage may operate based on a set of parameters, such as length of time, etc. Each of these parameters may be associated with the part as a lifecycle condition either through the storage element embedded in or on the part or through the database via an identifier of the part.

In either case, the information collected during formation, or any other stage of manufacturing, or any other stage of the product lifecycle, the information is associated with the identifier. That is, the identifier is the gate which allows the volumes of data to be accessed.

Of particular relevance, with tagged parts which also have embedded sensors, information about performance of the part during it final use period can be obtained. This may include information like strain information from an embedded strain gauge, possibly allowing for the predictive failure of a part prior to its actual failure. In one particular example, final use information may be directly from a user. For example, a user may submit information indicating how/when a part broke. In another example, the final use information may be from the part itself. That is, the sensor embedded within the part may indicate that a particular strain/stress is experienced and that predicts a particular defect and/or failure.

As described above, data collected related to any of the lifecycle conditions may be used to change the manufacturing operations. For example, data collected during any one of a formation stage (308), post processing stage (310), part testing stage (312), quality control stage (314), distribution stage (316), and final use stage (318) may be used to adjust the conditions experienced in any one of the other stages. As a particular example, information may indicate that during a post processing stage, a particular location was painted with a particular color. During the quality control stage (314) it may be indicated that the color at a particular location does not meet quality standards. Accordingly, the controller (FIG. 1, 106) may alter subsequent post processing operations to account for this lack of quality.

In another example, it may be determined during part testing or final use, that a particular part develops a crack at the same location after a period of time. Accordingly, the controller (FIG. 1, 106) may alter a formation operation, such as a part design file, or may alter a post processing operation, such as an unpacking of a 3D printed part, to ensure that the crack no longer develops.

Figure 4:
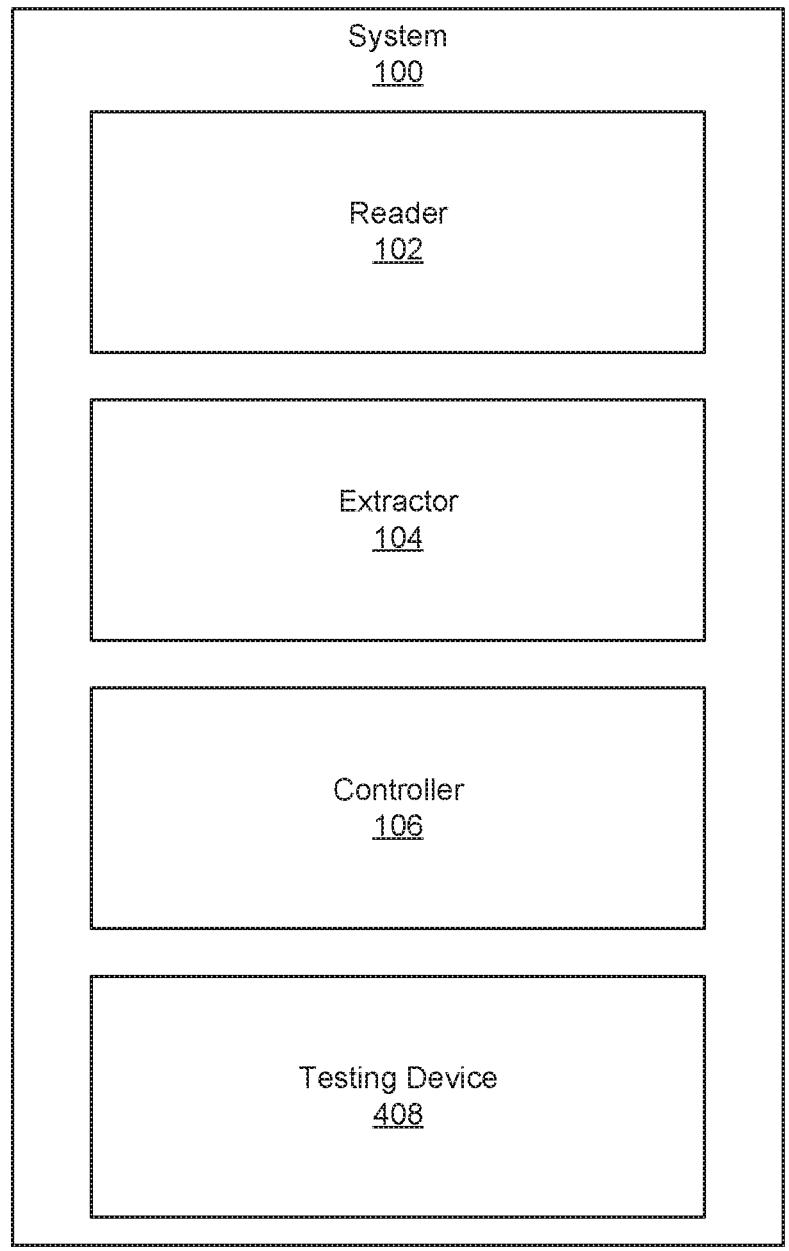
FIG. 4 is a block diagram of a system for altering manufacturing operations based on part-specific lifecycle conditions, according to another example of the principles described herein.

FIG. 4 is a block diagram of a system (100) for altering manufacturing operations based on part-specific lifecycle conditions, according to another example of the principles described herein. In the example depicted in FIG. 4, the system (100) includes a reader (102), extractor (104), and controller (106) as described above. In this specific example, the part is a 3D printed part, such that the reader reads an identifier from a storage element embedded within a 3D printed part and the extractor (104) extracts lifecycle conditions specific to the 3D printed part and the controller (106) alters print conditions. In this example, the system (100) also includes additional components. For example, the system (100) includes a testing device (408) to perform part testing on the 3D printed part. The testing of the part may indicate potential failure. The output of this testing may be correlated to the print conditions, such that certain print conditions may be flagged as leading to potential failure and avoided or altered to prevent such a correlation.

In some examples, the testing that is performed is based on extracted lifecycle conditions. That is, the controller (106) manages testing of the part using parameters selected based on extracted manufacturing conditions. For example, it may be the case during formation that certain print conditions exist. Based on historical information, it may be determined that such print conditions result in a strong part. Accordingly, rather than testing 10 parts per 100 produced, the testing parameters may indicate to test 1 part per 100 produced. By comparison, based on historical information, it may be determined that certain print conditions result in a weak part. Accordingly, rather than testing 10 parts per 100 produced, the testing parameters may indicate to test 20 parts per 100 produced.

In some examples, in addition to altering manufacturing operations, the controller (106) may provide other functionality. For example, the controller (106) may generate a notification of a recall based on extracted lifecycle conditions. For example, after a product has been released it may be determined that certain lifecycle conditions lead to a systemic failure of a part. Accordingly, the controller (106) may identify each part that includes these same lifecycle conditions and provide a notice to an associated user that the part is to be recalled so as to avoid the failure.

In yet another example, as the controller (106) may determine a predicted failure, the controller (106) may also determine a predicted re-order time based on extracted lifecycle conditions. Such a re-order time may be provided to the user to let them know if/when they should re-order the product to avoid such a predicted failure.

Such systems and methods 1) facilitate correlation between part failure and part lifecycle conditions; 2) facilitate closed loop manufacturing optimization, and 3) facilitate product design by evaluating performance of multiple components at a time. However, it is contemplated that the devices disclosed herein may address other matters and deficiencies in a number of technical areas.

What is claimed is:

1. A method comprising:
   reading an identifier from a storage element, the storage element embedded within a part;
   extracting, based on the identifier, lifecycle conditions specific to the part from the storage element embedded within the part;
   performing part testing on the part following formation; and
   altering manufacturing operations based on extracted lifecycle conditions for the part and an output of the part testing.

2. The method of claim 1, wherein:
   the part is a three-dimensional (3D) printed part; and
   the lifecycle conditions comprise print conditions for the 3D printed part.

3. The method of claim 1, wherein altering manufacturing operations comprises at least one of:
   altering manufacturing parameters;
   altering a part design file;
   altering a location of manufacturing devices;
   altering operating characteristics of the manufacturing devices; and
   altering part orientation along a manufacturing chain.

4. The method of claim 1, wherein manufacturing operations are altered further based on output of part testing of parts having similar characteristics.

5. A system comprising:
   a reader to read an identifier from a storage element, the storage element embedded within a part;
   an extractor to extract, based on the identifier, lifecycle conditions specific to the part from the storage element embedded within the part; and
   a controller to alter manufacturing operations based on the extracted lifecycle conditions for the part.

6. The system of claim 5, wherein:
   the part is a three-dimensional (3D) printed part; and
   the identifier is embedded in the 3D printed part.

7. The system of claim 5, wherein the controller is to manage testing of the part using parameters selected based on extracted lifecycle conditions.

8. The system of claim 5, wherein:
   the extracted lifecycle conditions indicate conditions in at least one stage through which the part passes along its lifecycle; and
   stages through which the part passes are selected from the group consisting of:
   a formation stage;
   a post processing stage;
   a quality control stage;
   a part testing stage;
   a part storage stage;
   a part shipping stage; and
   an end use stage.

9. The system of claim 8, wherein formation stage conditions are selected from the group consisting of:
   part pose within a build volume;
   build material information;
   agent material information;
   part temperature;
   manufacturing duration;
   part yield;
   manufacturing device type; and
   environmental conditions.

10. The system of claim 5, wherein the extractor is to extract information from at least one of:
    the storage element disposed on the part; and
    a device by which the part passes along its lifecycle.

11. The system of claim 5, wherein the lifecycle conditions represent an intentional variation from default lifecycle conditions.

12. The system of claim 5, wherein the controller determines a combination of manufacturing operations that result in a best performing part.

13. A system comprising:
    a reader to read an identifier from a storage element embedded within a three-dimensional (3D) printed part;
    an extractor to, based on the identifier, extract lifecycle conditions specific to the 3D printed part from the storage element embedded within the 3D printed part, wherein the lifecycle conditions are mapped to the identifier;
    a controller to alter print operations based on the extracted lifecycle conditions for the 3D printed part; and
    a testing device to perform part testing on the 3D printed part based on the extracted lifecycle conditions for the 3D printed part.

14. The system of claim 13, wherein the controller is to generate a notification of recall based on the extracted lifecycle conditions.

15. The system of claim 13, wherein the controller is to determine a predicted re-order time based on the extracted lifecycle conditions.

* * * * *